(12) United States Patent
Parla

(10) Patent No.: US 11,930,069 B1
(45) Date of Patent: Mar. 12, 2024

(54) HTTP/3 AND HTTP/2 CONNECTIVITY DETECTION USING PARALLEL PROBES FOR PREFERRED PROTOCOL SELECTION

(71) Applicant: Cisco Technology, Inc., San Jose, CA (US)

(72) Inventor: Vincent E. Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/115,516

(22) Filed: Feb. 28, 2023

(51) Int. Cl.
*G06F 15/16* (2006.01)
*H04L 67/02* (2022.01)
*H04L 67/2871* (2022.01)

(52) U.S. Cl.
CPC .......... *H04L 67/02* (2013.01); *H04L 67/2871* (2013.01)

(58) Field of Classification Search
CPC ............................ H04L 67/02; H04L 67/2871
USPC .......................................................... 709/230
See application file for complete search history.

(56) References Cited

U.S. PATENT DOCUMENTS

| 10,291,682 | B1 | 5/2019 | Vishwanathan | |
|---|---|---|---|---|
| 11,196,712 | B1 | 12/2021 | Norbutas | |
| 11,196,833 | B1 * | 12/2021 | Norbutas | H04L 63/0272 |
| 11,258,823 | B2 * | 2/2022 | Dutta | H04L 63/0428 |
| 11,303,647 | B1 * | 4/2022 | Wu | H04L 63/105 |
| 11,489,899 | B1 * | 11/2022 | Giladi | H04N 21/23424 |
| 11,496,403 | B2 * | 11/2022 | Choi | H04L 47/11 |
| 2007/0192325 | A1 * | 8/2007 | Morris | H04L 67/02 |
| 2020/0383012 | A1 | 12/2020 | Tseng | |
| 2022/0311745 | A1 * | 9/2022 | Molander | H04L 67/02 |
| 2022/0329641 | A1 * | 10/2022 | Giladi | H04N 21/44029 |
| 2022/0345463 | A1 * | 10/2022 | Wu | H04L 63/0815 |
| 2022/0385719 | A1 * | 12/2022 | Yokomitsu | H04L 9/0825 |
| 2023/0008525 | A1 * | 1/2023 | Iyengar | H04L 67/535 |

(Continued)

OTHER PUBLICATIONS

Gupta, A., & Bartos, R. (Mar. 2022). User Experience Evaluation of HTTP/3 in Real-World Deployment Scenarios. In 2022 25th Conference on Innovation in Clouds, Internet and Networks (ICIN) (pp. 17-23). IEEE.

(Continued)

*Primary Examiner* — Moustafa M Meky
(74) *Attorney, Agent, or Firm* — Lee & Hayes P.C.

(57) ABSTRACT

Techniques for determining whether HTTP/2 or HTTP/3 is a preferred protocol for communication between a client device and a server over a network are described. A change associated with a network interface of a client device is detected. Based at least in part on detecting the change, a determination is made to identify a preferred communication protocol for a network over which the client device communicates using the network interface. A HTTP/2 probe is transmitted over the network and to a server. A HTTP/3 probe is transmitted over the network and to the server. In response to not receiving a HTTP/3 probe response, the preferred communication protocol is determined to be HTTP/2. In response to receiving the HTTP/2 probe response and the HTTP/3 probe response, the preferred communication protocol is determined to be HTTP/3. The client device communicates with the server over the network using the preferred communication protocol.

20 Claims, 4 Drawing Sheets

(56) References Cited

U.S. PATENT DOCUMENTS

2023/0074934 A1\* 3/2023 Li .................. H04W 12/10
2023/0198964 A1\* 6/2023 Viswambharan ..... H04L 69/164
                                                                                   713/168

OTHER PUBLICATIONS

Marx, R., Decker, T. D., Quax, P., & Lamotte, W. (Sep. 2019). Resource Multiplexing and Prioritization in HTTP/2 over TCP Versus HTTP/3 over QUIC. In International Conference on Web Information Systems and Technologies (pp. 96-126). Springer, Cham.
"Happy Eyeballs Version 2: Better Connectivity Using Concurrency", << https://datatracker.ietf.org/doc/html/rfc8305>>, received on Nov. 9, 2023, 15 pages.
"Happy Eyeballs: Success with Dual-Stack Hosts", << https://datatracker.ietf.org/doc/html/rfc6555>>, retrieved on Nov. 9, 2023, 15 pages.
"Implementation and Evaluation of HTTP/3 Connectivity Check Using Happy Eyeballs Algorithm", https://www.mdpi.com/2673-8732/2/3/24, retrieved on Nov. 9, 2023, 18 pages.
"Multiplexed Application Substrate over QUIC Encryption (masque)", << https://datatracker.ietf.org/group/masque/about/>>, retrieved on Nov. 9, 2023, 3 pages.
"QUIC: A UDP-Based Multiplexed and Secure Transport", << https://datatracker.ietf.org/doc/html/rfc9000>>, retrieved on Nov. 9, 2023, 161 pages.

\* cited by examiner

US 11,930,069 B1

HTTP/3 AND HTTP/2 CONNECTIVITY DETECTION USING PARALLEL PROBES FOR PREFERRED PROTOCOL SELECTION

TECHNICAL FIELD

The present disclosure relates generally to determining whether HTTP/2 or HTTP/3 is a preferred protocol for communication between a client device and a server over a network based on network conditions.

BACKGROUND

HyperText Transfer Protocol (HTTP) is an application layer protocol for transmitting hypermedia documents and is designed for communication between web browsers and web servers. HTTP is the foundation of data communication for the World Wide Web. HTTP follows a client-server model where a client opens a connection, makes a request and waits for the server to return a response. As an application layer protocol within the framework of the Internet protocol suite, HTTP presumes an underlaying and reliable transport layer protocol. Currently, the two most prominent versions, HTTP/2 and HTTP/3, have different transport layer protocol. HTTP/2 uses Transmission Control Protocol (TCP), and the newer HTTP/3 uses User Datagram Protocol (UDP) as a transport layer. HTTP/3 evolved to use QUIC plus UDP transport protocols instead of TCP/IP connections to improve the average speed of communications and avoid problems of TCP/IP connection congestion that can temporarily block or slow down data flow.

Because HTTP/3 provides better transmission speed, shorter loading times, and more stable connections, HTTP/3 may be preferred over HTTP/2. However, depending on network configuration, some networks may block HTTP/3, in these instances, HTTP/2 may be the preferred protocol. A typical approach for determining whether to use HTTP/2 or HTTP/3 is to attempt HTTP/3 in an operating system (OS), web browser, or application, and then fallback to HTTP/2 if the attempt at HTTP/3 fails. This approach delays the protocol until the failure is detected. Moreover, when a network interface change occurs, the behavior of the network may change. For example, a cellular connection might allow HTTP/3 while an enterprise Wi-Fi connection might not. As a result, interface roaming may cause a disruption at the HTTP/x layer causing a poor user experience. Another connection approach may occur in HTTP/2 has the ability to advertise HTTP/3 capabilities and an automatic step up from HTTP/2 to HTTP/3 may occur. However, this presents inefficiencies in that a session must be started with HTTP/2 and then migrate to HTTP/3 after some period of time.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
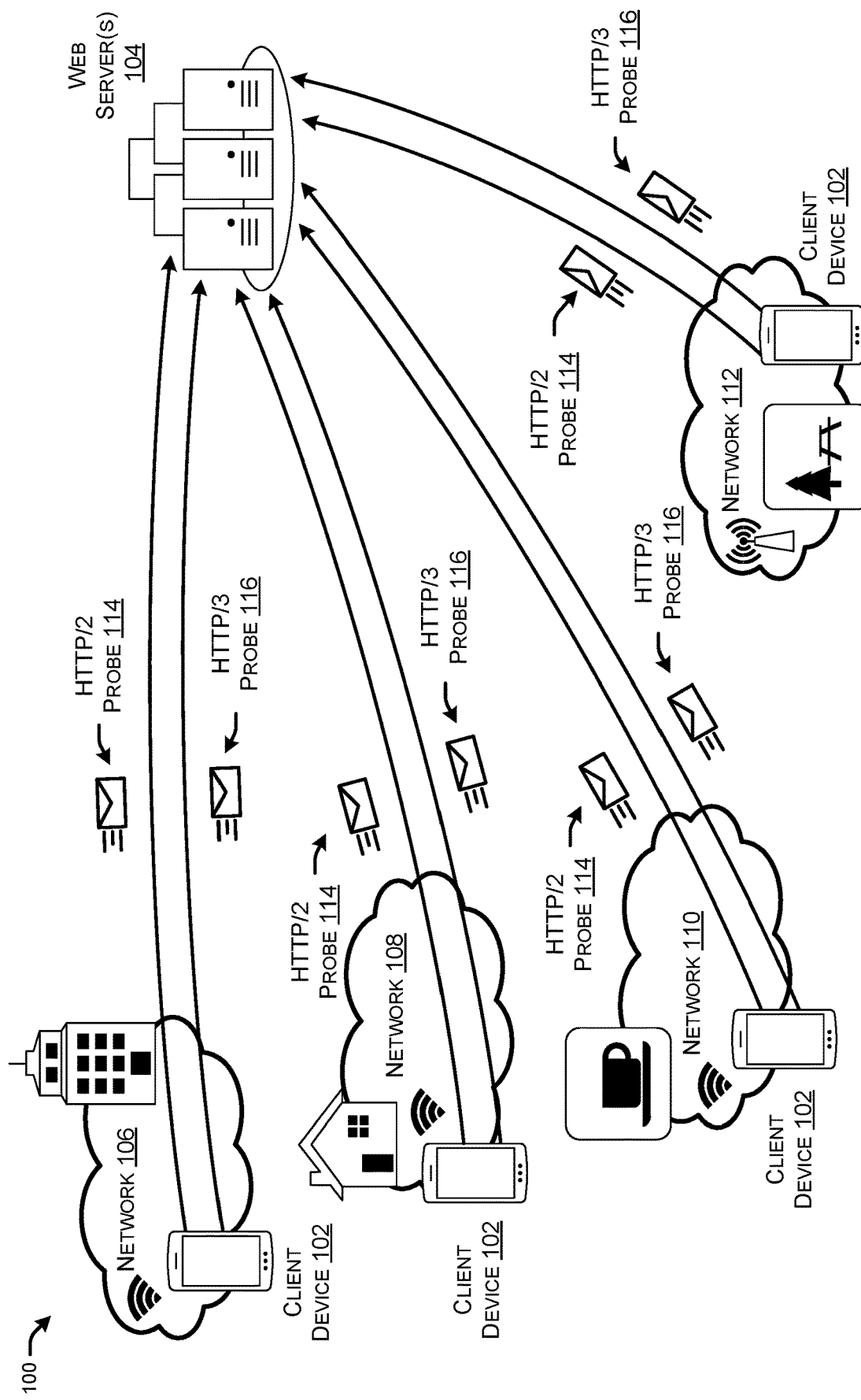
FIG. 1 illustrate a system-architecture diagram of an example environment for determining whether HTTP/2 or HTTP/3 is a preferred protocol for communicating over different networks between a client device and a server.

This disclosure describes a method for determining whether HTTP/2 or HTTP/3 is a preferred communication protocol based on network conditions. The method may include detecting a change associated with a network interface of a client device. Further, based at least in part on detecting the change, the method may include determining to identify a preferred communication protocol for a network over which the client device communicates using the network interface. The method may also include transmitting, from the client device a HTTP/2 probe over the network and to a server. Further, the method may include transmitting, from the client device, an HTTP/3 probe over the network and to the server. Additionally, in response to receiving an HTTP/2 probe response and not a HTTP/3 probe response, the method may include determining that HTTP/2 is the preferred communication protocol. Additionally, in response to receiving the HTTP/2 probe response and the HTTP/3 probe response, the method may include determining that HTTP/3 is the preferred communication protocol. Finally, the method may include communicating with the server using the preferred communication protocol over the network.

Example Embodiments

Conventionally, HTTP is the foundation for data communication between web browsers and web servers via the World Wide Web. The two most recent versions HTTP/2 and HTTP/3 are the most used. HTTP/2 and HTTP/3 each use a different underlying transport layer protocol. HTTP/2 uses TCP and HTTP/3 uses UDP. In addition, HTTP/2 and HTTP/3 also use different encapsulation and security layer protocols, HTTP/2 uses TLS and HTTP/3 uses QUIC & TLS 1.3. Thus HTTP/2 is TLS on top of TCP and HTTP/3 is QUIC on top of UDP. Thus, HTTP/3 provides better transmission speed, shorter loading times, and more stable connections between web browsers and web servers. However, because HTTP/3 is a much newer protocol, not all network configurations will support HTTP/3 resulting in a need to fallback to using HTTP/2.

Enterprise networks often block all protocols except for HTTP or HTTPS via TCP on port 443. These are typically HTTP/1 or HTTP/2 based protocols. HTTP/3 is a UDP based protocol using QUIC on port 443. Currently, there is a likelihood that some networks will block this protocol. For example, an intermediary device (e.g., a firewall) in a network may block UDP protocols not allowing a client device to open a connection with a server. Some enterprise networks require data communications to go through a web proxy that only supports TCP protocol, thus not allowing UDP through.

This disclosure describes techniques for detecting the viability of HTTP/3 based on network conditions by using parallel HTTP/3 and HTTP/2 probes sent from browsers, applications or the OS in a given network on startup or when a network interface change is detected at a client device. A HTTP/3 probe can provide a means of detecting if UDP:443 will be successful in a given network or not, by determining whether a web server supports HTTP/3 as well as whether the given network can be traversed with HTTP/3. Thus, the protocol that will be successful at traversing the network to be used and is supported by the web server, at least until an interface change event occurs, is determined.

At device startup, or when one or more network interface changes occur (e.g., a device joins a network, or switches Wi-Fi interfaces, roams to a cellular interface, etc.), the client device will send out one or more simultaneous HTTP/3 probes and one or more simultaneous HTTP/2 probes to a server. The client device will await the responses of both sets of probes and will cache the results for that interface map, thus it will remember that when using a specific SSID with a particular IP and network configuration on that interface, that one HTTP/x protocol is preferred over the other. If the network parameters of an interface do not change, the cached results are used on subsequent connections to the network.

If on startup, or network connection, there are no previous cached results for the interface map, a new set of probes are sent to ascertain whether HTTP/3 or HTTP/2 will be successful in that network. When both the HTTP/3 probe and the HTTP/2 probe are answered, HTTP/3 will be preferred over HTTP/2.

Alternately or in addition, in some examples, the probes will be crafted in such a way as to determine overall performance of one HTTP/x protocol versus another to ascertain which will have the better performance characteristics on a given network. This may include sending multiple HTTP/2 probes and HTTP/3 probes of various sized packets so as to ascertain if there are any maximum transmission unit (MTU) limitations for either of HTTP/2 or HTTP/3 in the network. Thus, if one of the HTTP/x protocols has a limitation, but the other does not, this network condition may be a factor used to determine the preferred protocol for data communication in a network between a client device and a web server.

As described above, in some examples, parallel HTTP/3 and HTTP/2 probes may be sent from a web browser, application or OS on a client device to a web server on a given network to determine a preferred data communication protocol. The process may be initiated at client device startup, or when a client device first joins the network. In another example, the process may be initiated at predetermined time intervals, or some other user defined specification.

FIG. 1 illustrates an example environment 100 for implementing at least some of the various technologies disclosed herein. In particular, FIG. 1 illustrates several example networks to which a client device can join and over which the client device may communicate with a web server. A preferred communication protocol between the client device and web server may be determined by sending parallel HTTP/3 and HTTP/2 probes from the client device to the web server over each network to detect the viability of HTTP/3 based on the conditions of the particular network. The environment 100 includes client device 102 and web server 104. For example, the client device 102 may be a smart phone as illustrated, however the client device is not limited to a smart phone and may also be a workstation, desktop computer, laptop, tablet, e-reader, or any other type of client device that may join a network.

Environment 100 also includes several different networks, networks 106-112, that the client device 102 may join and use to connect to the web server 104. For example, network 106 may be a Wi-Fi network of an enterprise organization at which a client associated with the client device 102 works. Network 108 may be a Wi-Fi network at the home of the user associated with the client device 102. Network 110 may be a Wi-Fi network at a local coffee shop that client device 102 may join while the associated user is visiting the coffee shop. Finally, network 112 may be a cellular network that the client device 102 may join while at a neighborhood park to which the user associated with the client device 102 frequents. Each of the different networks 106-112 have different network configurations, thus while the client device 102 may communicate with the web server 104 using a particular HTTP/x protocol while joined to one of the networks, the same HTTP/x protocol may not be the preferred protocol for one, or any, of the other networks. Thus, techniques described herein may be leveraged to detect the viability of HTTP/3 on each of the different configurations of networks 106-112 and determine a preferred HTTP/x protocol to be used for communication with the web server 104 on each of the different networks.

When client device 102 joins a Wi-Fi network 106 of an enterprise organization where a user associated with the client device 102 works, a web browser, application, or OS of the client device 102 sends parallel probes over the network 106 to the web server 104 to detect if the web server 104 is compatible with HTTP/3 and if HTTP/3 and the packets can traverse the network 106 as configured. As illustrated a HTTP/2 probe 114 and a parallel HTTP/3 probe 116 are sent to the web server 104 from the client device. The Client device 102 then waits for probe responses to determine which protocol is a preferred, protocol HTTP/2 or HTTP/3, for network 106 as configured. If an HTTP/3 probe response is received, HTTP/3 is the preferred protocol. However, often enterprise networks, such as network 106, may contain intermediary devices, such as firewalls, which may block UDP protocols and not allow the client device 102 to open a connection with server 104 using HTTP/3. In addition, some enterprise networks require data communications to go through a web proxy that only supports TCP protocols, thus, HTTP/2 would be the preferred protocol as HTTP/3 would be blocked and not able to traverse the network as configured.

Once a preferred protocol for communication over network 106 is determined, the results may be cached such that on subsequent connections to network 106, client device 102 may remember the preferred protocol and immediately start communicating using the preferred protocol without the need to send additional HTTP/x probes. If an interface change occurs, new probes may be sent to re-determine a preferred protocol. Alternately or in addition, new probes may be sent at predetermined time intervals, on device startup, each time the network 106 is joined by client device 102, or any other user defined criteria.

In another example, when a user associated with client device 102 is home, the client device 102 may join home Wi-Fi network 108. The client device 102 may check to see if there is a preferred protocol cached from a previous session via the network 108. If there is a preferred protocol cached, the client device 102 may immediately begin communicating with server 104 using the preferred protocol without sending any HTTP/x probes. If a preferred protocol for network 108 is not cached, or if there has been a network configuration change or some other network interface change since the last time device 102 joined network 108, a web browser, application, or device OS may send out HTTP/2 probe 114 and parallel HTTP/3 probe 116 and wait for probe responses. If only a probe response for HTTP/2 is received, HTTP/2 is the preferred protocol for communicating over network 108. If both an HTTP/2 probe response and an HTTP/3 probe response are returned, then the preferred protocol for network 108 is HTTP/3. When a preferred protocol is determined, it may be cached for subsequent connections to network 108.

In another example, when a user associated with client device 102 visits a coffee shop, the client device 102 may join Wi-Fi network 110. If the user frequents the coffee shop, a preferred protocol may already be cached from prior visits and when the client device 102 joins network 110, the client device 102 may immediately start communicating with the web server 104 using the cached preferred protocol as long as no network configuration changes have occurred, and no other interface changes are detected. If it is a first time client device 102 has joined network 110 (or a network interface change is detected) a web browser, application, or OS on the client device 102 may send a HTTP/2 probe 114 and a parallel HTTP/3 probe 116 over the network 110 to web server 104 to determine which HTTP/x protocol is preferred. As described in the examples above, if client device 102 receives a HTTP/3 probe response, HTTP/3 is the preferred protocol, if an HTTP/3 probe response is not received, then HTTP/2 is the preferred protocol. The preferred protocol may be cached for the next time the user associated with client device 102 visits the coffee shop and joins Wi-Fi network 110.

In another example, when a user associated with the client device 102 visits a local park, the client device 102 may connect to the Internet via a cellular network 112 as shown. If the user frequents the local park and often connects to the Internet in that location, a preferred protocol may already be cached from previous occasion in which the client device 102 was at that location. The client device 102 may check if a preferred protocol is cached, and if so, use the preferred protocol to communicate with the web server 104. If no preferred protocol is cached, of if the client device 102 detects that a network interface change has occurred since the last time the client device 102 joined the cellular network 112, a web browser, application, or OS on the client device may send a HTTP/2 probe 114 and a parallel HTTP/3 probe 116 over the network 112 to web server 104 to determine which HTTP/x protocol is preferred. As described in the examples above, if client device 102 receives a HTTP/3 probe response, HTTP/3 is the preferred protocol, if an HTTP/3 probe response is not received, then HTTP/2 is the preferred protocol. The preferred protocol may be cached for the next time the user associated with client device 102 visits the local park and joins the cellular network 112.

Figure 2:
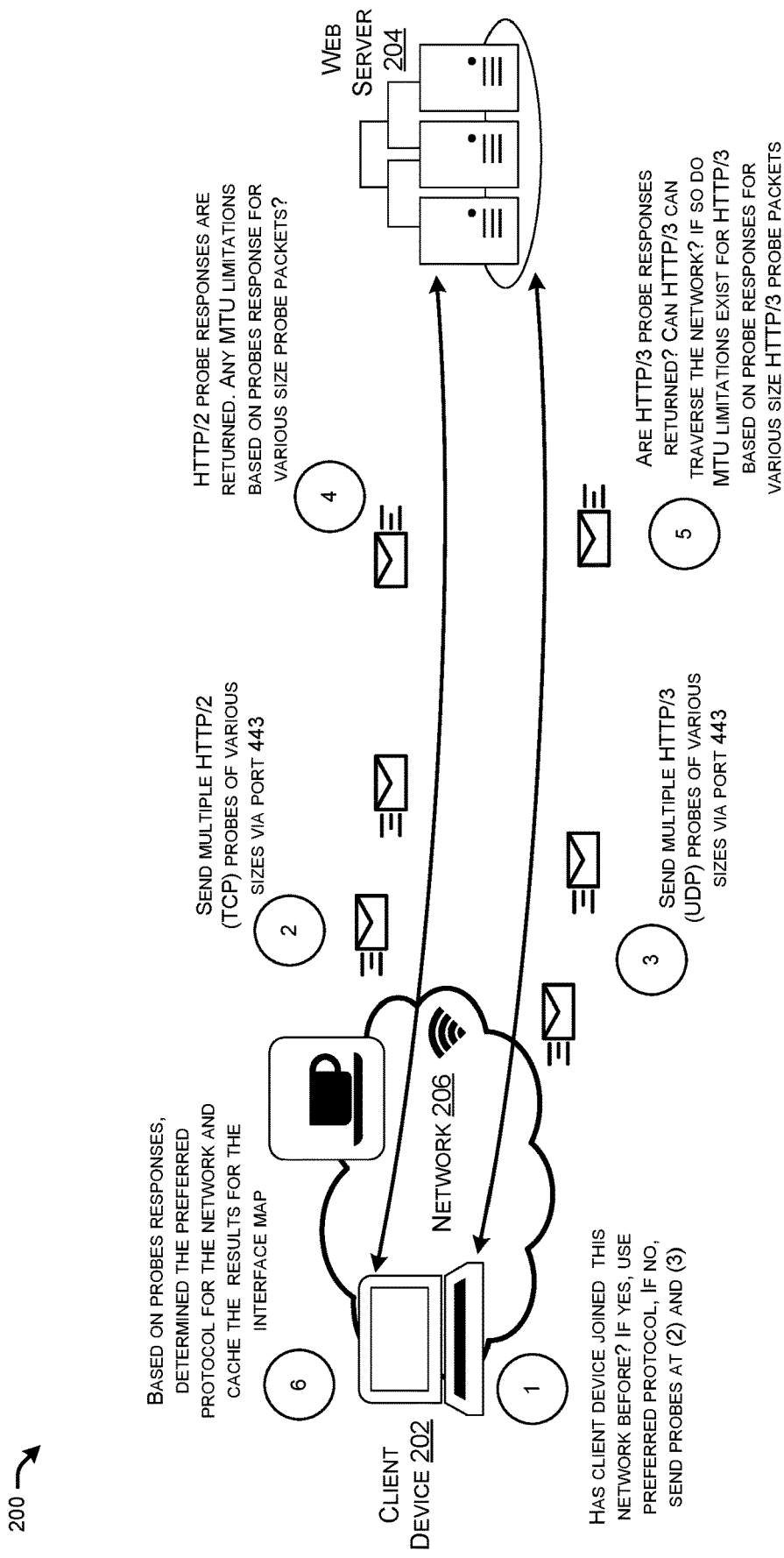
FIG. 2 illustrates a system-architecture diagram of an example environment for determining whether HTTP/2 or HTTP/3 is a preferred protocol for communication over a network between a client device and a server.

FIG. 2 illustrates an example environment 200, similar to the examples shown in FIG. 1, is which a client device 202 connects to a web server 204 via a network 206 and a preferred HTTP/x protocol may be determined based on network conditions. The client device 202 is shown joining a Wi-Fi network 206 at a coffee shop similar to the example in FIG. 1. However, this is for exemplary purposes and the process as described with reference to FIG. 2 may apply to any type of network that a client device may join in any location.

At (1), once the client device 202 joins the network 206, a determination is made whether the client device 202 has joined this network 206 before, or if this is the first time. If the client device 202 has joined the network 206 before, the client device 202 will check to see if a preferred HTTP/x protocol is cached for the network 206. If the client device 202 has joined the network before, and there is a preferred HTTP/x protocol cached, a determination will be made whether the network configuration is the same as when the preferred HTTP/x protocol was cached and whether there are any network interface changes detected. If no network interface changes are detected, and the network configuration is the same, the client device 202 may use the cached preferred HTTP/x protocol to communicate with the web server 204. Alternately or in addition, in some examples, even if there is a cached preferred HTTP/x protocol, parallel probes may be sent each time the client device 202 joins network 206, at predetermined time intervals, or any other user defined criteria.

If there is not a preferred protocol cached for the network 206, or if a network interface change is detected or the network configuration has changed, at (2) and (3) a web browser, application, or OS on the client device 202 will send parallel probes to the web server 204 to determine a preferred HTTP/x protocol for the network 206. Specifically, at (2) multiple HTTP/2 probes, having transport layer TCP protocol, are sent to the web server via port 443. The multiple HTTP/2 probes may have various packet sizes to assist in determining which HTTP/x protocol will have better performance characteristics on network 206 as configured. Similarly, at (3) multiple HTTP/3 probes, having transport layer UDP protocol, are sent to the web server via port 443. The multiple HTTP/3 probes may have various packet sizes to assist in determining if either HTTP/2 or HTTP/3 have any MTU limitations on network 206 as configured.

At (4) HTTP/2 probe responses are returned to client device 202 from the web server 204. Since the HTTP/2 probes sent to the web server at (2) are of various packet sizes, it can be determined whether there are any MTU limitations in the network 206 regarding HTTP/2 protocol. At (5) HTTP/3 probe responses are returned if HTTP/3 can traverse the network 206 and web server 204 is compatible with HTTP/3. If HTTP/3 probe responses are returned, it can be determined whether any MTU limitations are present in the network 206 based on the various packet sizes of the HTTP/3 probes send at (3).

At (6) a preferred HTTP/x protocol for the network 206 is determined and the results are cached for any future times the client device 202 joins the network 206. If no HTTP/3 probe responses are received by client device 202, HTTP/3 cannot traverse the network 206 and HTTP/2 is the fallback preferred protocol for network 206. If both HTTP/2 and HTTP/3 probe responses are received, HTTP/3 can traverse the network 206 and is most likely the preferred protocol. However, in some examples based on the various packet sizes, any MTU limitations that may exist in network 206 for either HTTP/2 or HTTP/3 can be determined and considered when determining a preferred HTTP/x protocol for network 206.

Figure 3:
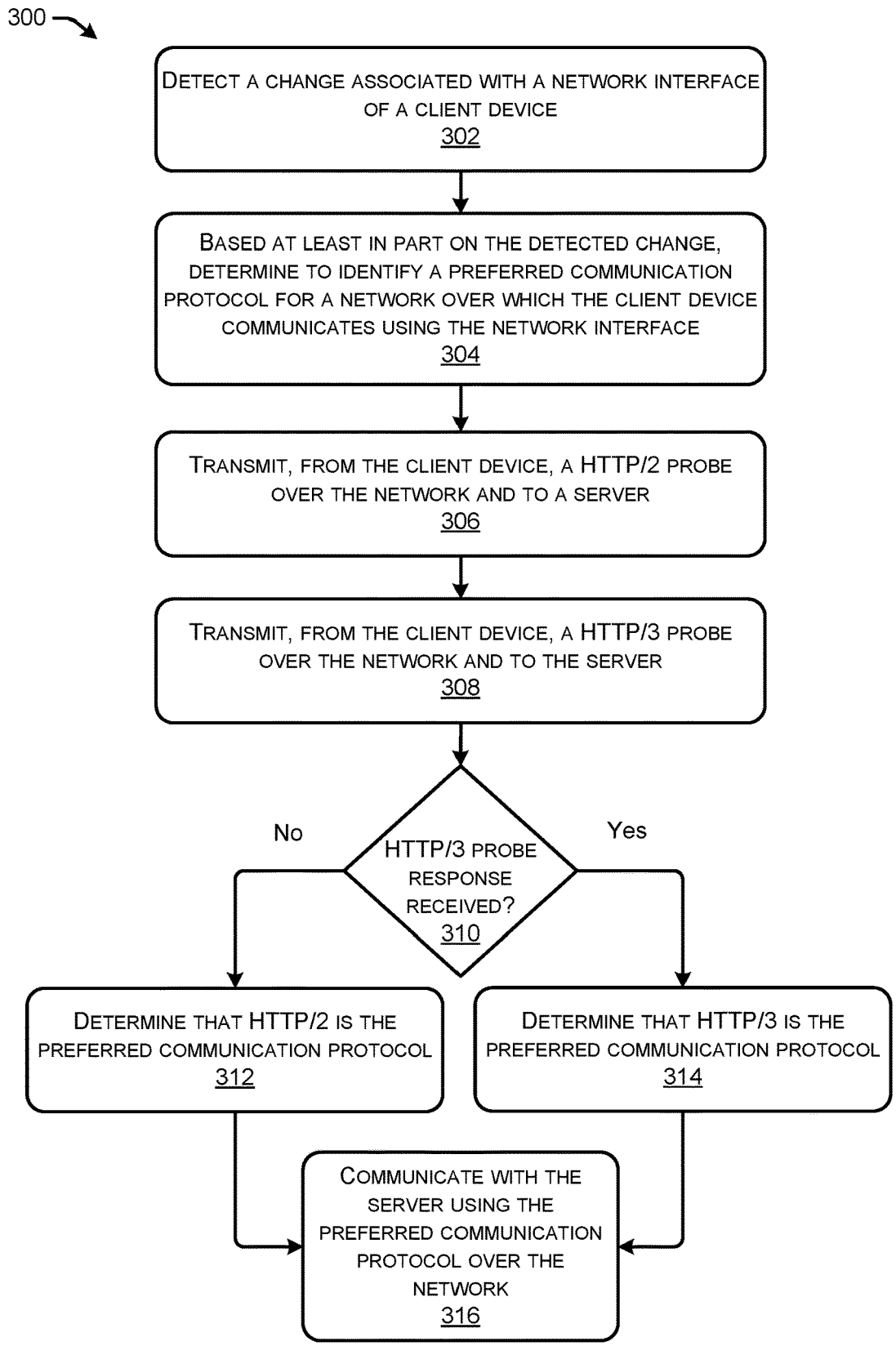
FIG. 3 illustrates a flow diagram of an example method performed to determine a preferred protocol to use to communicate over a network between a client device and a server.

FIG. 3 illustrates a flow diagram of example process 300 that describes aspects of the functions performed at least partly by a client device 102 as described with reference to FIG. 1 and FIG. 2. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and as described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 302, a change associated with a network interface of a client device is detected. For example, when a client device joins a network, or switches from one network to another (e.g., roams to a cellular network, switches Wi-Fi networks, etc.) a change is detected. Referring to FIG. 1, when the client device 102 is connected to network 110 at a coffee shop and then moves to the network 112 at the local park, a network interface change is detected. In another example, if a network configuration change occurs (e.g., a network middlebox is reconfigured, added, removed, etc.), a change is detected.

At operation 304, based at least in part on the change detected in operation 302, a determination to identify a preferred communication protocol for a network over which the client device communicates using the network interface is made. When a network interface change occurs, a preferred HTTP/x protocol may be determined to facilitate the best possible user experience.

At operation 306, the client device transmits an HTTP/2 probe over the network and to a server. For example, referring to FIG. 1, the client device 102 sends an HTTP/2 probe 114 over a network 106-112 to which it joins, to web server 104. Referring to FIG. 2, at (2) the client device 202 sends multiple HTTP/2 probes of various sized packets to the web server 204.

At operation 308, the client device transmits a HTTP/3 probe over the network and to the server. For example, referring to FIG. 1, the client device 102 sends HTTP/3 probe 116 over a network 106-112 to which it joins, to web server 104 in parallel to the HTTP/2 probe 114. Referring to FIG. 2, at (3) the client device 202 sends multiple HTTP/3 probes of various sized packets to the web server 204 in parallel to the HTTP/2 packets sent at (2).

At operation 310, a determination is made whether an HTTP/3 probe response is received by the client device from the server. Referring to FIG. 2, at (5) a determination is made whether HTTP/3 can transverse the network 206. If a HTTP/3 response is sent to the client device 202 from the web server 204, the network 206 can be traversed using HTTP/3.

At operation 312, if an HTTP/3 probe response is not received by the client device from the server, a determination is made that HTTP/2 is the preferred communication protocol. Referring to FIG. 2, at (5) if no HTTP/3 probe response is sent from the web server 204 to the client device 202, HTTP/3 cannot traverse the network and HTTP/2 is the preferred HTTP/x protocol for communication in network 206.

At operation 314, if an HTTP/3 probe response is received by the client device from the server, a determination is made that HTTP/3 is the preferred communication protocol. In FIG. 2 at (5) if HTTP/3 probe responses are sent from the web server 204 to the client device 202, HTTP/3 can traverse the network 206 and HTTP/3 is the preferred protocol.

At operation 316, the client device communicates with the server over the network using the preferred communication protocol that was determined in operations 310-314. Once a preferred protocol for the network is determined, that client device can use the preferred protocol to communicate with the web server in that particular network.

Figure 4:
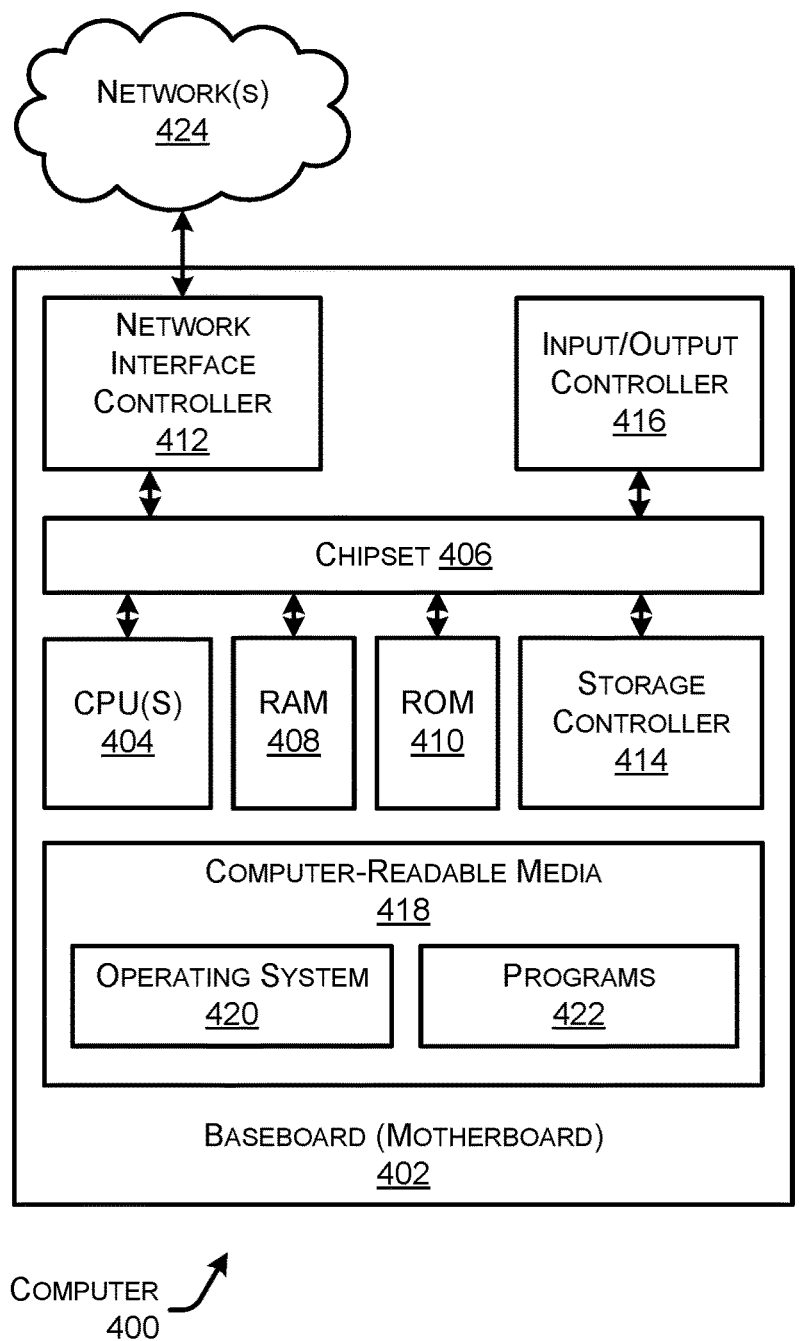
FIG. 4 illustrates a computer architecture diagram showing an example computer hardware architecture for implementing a network device that can be utilized to implement aspects of the various technologies presented herein.

FIG. 4 shows an example computer architecture for a computer 400 capable of executing program components for implementing the functionality described herein. The computer architecture shown in FIG. 4 illustrates a conventional server computer, workstation, desktop computer, laptop, tablet, network appliance, e-reader, smartphone, or other computing device, and can be utilized to execute any of the software components presented herein. The computer 400 may, in some examples, correspond to any of the servers and devices discussed herein. In some embodiments, computer 400 may include networked devices such as servers, switches, routers, hubs, bridges, gateways, modems, repeaters, access points, firewalls etc. Additionally, in some implementations, the programs or software discussed herein may be configured to perform operations performed by any of the devices. In some instances, the computer may correspond to any device described herein and be configured to perform operations performed by any device, and/or may be a system of devices that perform the techniques described herein.

The computer 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a read-only memory ("ROM") 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network 424, such as the network 106, network 108, network 110, and network 112 as illustrated in FIG. 1. The chipset 406 can include functionality for providing network connectivity through a Network Interface Controller (NIC) 412, such as a gigabit Ethernet adapter. The NIC 412 is capable of connecting the computer 400 to other computing devices over the network 424. It should be appreciated that multiple NICs 412 can be present in the computer 400, connecting the computer to other types of networks and remote computer systems.

The computer 400 can be connected to a storage device 418 that provides non-volatile storage for the computer. The storage device 418 can store an operating system 420, programs 422, and data, which have been described in greater detail herein. The storage device 418 can be connected to the computer 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computer 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device 418 by detecting the physical states or characteristics of one or more particular locations within the physical storage units.

In addition to the mass storage device 418 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400. In some examples, the operations performed by devices described herein, and or any components included therein, may be supported by one or more devices similar to computer 400. Stated otherwise, some or all of the operations performed by the client device 102, the application server(s) 104, and or any components included therein, may be performed by one or more computer devices 400 operating in a system.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computer 400.

In one embodiment, the storage device 418 or other computer-readable storage media is encoded with computer-executable instructions which, when loaded into the computer 400, transform the computer from a general-purpose computing system into a special-purpose computer capable of implementing the embodiments described herein. These computer-executable instructions transform the computer 400 by specifying how the CPUs 404 transition between states, as described above. According to one embodiment, the computer 400 has access to computer-readable storage media storing computer-executable instructions which, when executed by the computer 400, perform the various processes described herein. The computer 400 can also include computer-readable storage media having instructions stored thereupon for performing any of the other computer-implemented operations described herein.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computer 400 might not include all of the components shown in FIG. 4, can include other components that are not explicitly shown in FIG. 4, or might utilize an architecture completely different than that shown in FIG. 4.

As described herein, the computer 400 may comprise one or more of a client device, and/or a server. The computer 400 may include one or more hardware processors 404 (processors) configured to execute one or more stored instructions. The processor(s) 404 may comprise one or more cores. Further, the computer 400 may include one or more network interfaces configured to provide communications between the computer 400 and other devices, such as the communications described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi, Bluetooth, Zigbee IEEE 802 family of protocols and so forth.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   detecting a change associated with a network interface of a client device;
   based at least in part on detecting the change, determining to identify a preferred communication protocol for a network over which the client device communicates using the network interface;
   transmitting, from the client device, a Hypertext Transfer Protocol (HTTP)/2 probe over the network and to a server;
   transmitting, from the client device, an HTTP/3 probe over the network and to the server;
   in response to receiving an HTTP/2 probe response and not a HTTP/3 probe response, determining that HTTP/2 is the preferred communication protocol; or
   in response to receiving the HTTP/2 probe response and the HTTP/3 probe response, determining that HTTP/3 is the preferred communication protocol; and
   communicating with the server using the preferred communication protocol over the network.

2. The method of claim 1, further comprising transmitting the HTTP/2 probe and the HTTP/3 probe over the network and to the server using port 443.

3. The method of claim 1, further comprising:
   caching results of the preferred communication protocol for the network interface; and
   based on network parameters of the network interface not changing, communicating with the server using the preferred communication protocol over the network on subsequent connections to the network.

4. The method of claim 1, wherein the change associated with the network interface comprises at least one of:
   joining a new network by the client device;
   switching from a first network to a second network by the client device; or
   determining a network configuration change has occurred.

5. The method of claim 4, further comprising:
   joining a new network by the client device;
   caching information regarding whether HTTP/2 or HTTP/3 is a preferred communication protocol for the new network; and
   using the preferred communication protocol on subsequent connections to the new network.

6. The method of claim 1 further comprising:
   determining, at client device startup, if information regarding whether HTTP/2 or HTTP/3 is a preferred communication protocol is cached;
   in response to information regarding a preferred communication protocol being cached, communicating using the preferred communication protocol; or
   in response to information regarding a preferred communication protocol not being cached, transmitting the HTTP/2 and HTTP/3 probes over the network and to the server.

7. The method of claim 1, further comprising:
   transmitting, from the client device, multiple HTTP/2 probes over the network and to the server, wherein each of the multiple HTTP/2 probes are of a different packet size;
   transmitting, from the client device, multiple HTTP/3 probes over the network and to the server, wherein each of the multiple HTTP/3 probes are of a different size;
   based at least in part on HTTP/2 probe responses received and HTTP/3 probe responses received, determining if there are maximum transmission unit (MTU) limitations for either HTTP/2 or HTTP/3; and
   in response to determining that MTU limitations exist for one of HTTP/2 or HTTP/3, determining to communicate with the server using the protocol without an MTU limitation.

8. A system comprising:
   one or more processors; and
   one or more non-transitory computer-readable media storing computer-executable instructions that, when executed by the one or more processors, cause the one or more processors to perform operations comprising:
   detecting a change associated with a network interface of a client device;
   based at least in part on detecting the change, determining to identify a preferred communication protocol for a network over which the client device communicates using the network interface;
   transmitting, from the client device, a Hypertext Transfer Protocol (HTTP)/2 probe over the network and to a server;
   transmitting, from the client device, an HTTP/3 probe over the network and to the server;
   in response to receiving an HTTP/2 probe response and not a HTTP/3 probe response, determining that HTTP/2 is the preferred communication protocol; or
   in response to receiving the HTTP/2 probe response and the HTTP/3 response, determining that HTTP/3 is the preferred communication protocol; and
   communicating with the server using the preferred communication protocol over the network.

9. The system of claim 8, the operations further comprising transmitting the HTTP/2 probe and the HTTP/3 probe over the network and to the server using port 443.

10. The system of claim 8, the operations further comprising:
    caching results of the preferred communication protocol for the network interface; and
    based on network parameters of the network interface not changing, communicating with the server using the preferred communication protocol over the network on subsequent connections to the network.

11. The system of claim 8, wherein the change associated with the network interface comprises at least one of:
    joining a new network by the client device;
    switching from a first network to a second network by the client device; or
    determining a network configuration change has occurred.

12. The system of claim 11, the operations further comprising:
    joining a new network by the client device;
    caching information regarding whether HTTP/2 or HTTP/3 is a preferred communication protocol for the new network; and
    using the preferred communication protocol on subsequent connections to the new network.

13. The system of claim 8, the operations further comprising:
   determining, at client device startup, if information regarding whether HTTP/2 or HTTP/3 is a preferred communication protocol is cached;
   in response to information regarding a preferred communication protocol being cached, communicating using the preferred communication protocol; or
   in response to information regarding a preferred communication protocol not being cached, transmitting the HTTP/2 and HTTP/3 probes over the network and to the server.

14. The system of claim 8, the operations further comprising:
   transmitting, from the client device, multiple HTTP/2 probes over the network and to the server, wherein each of the multiple HTTP/2 probes are of a different packet size;
   transmitting, from the client device, multiple HTTP/3 probes over the network and to the server, wherein each of the multiple HTTP/3 probes are of a different size;
   based at least in part on HTTP/2 probe responses received and HTTP/3 probe responses received, determining if there are maximum transmission unit (MTU) limitations for either HTTP/2 or HTTP/3; and
   in response to determining that MTU limitations exist for one of HTTP/2 or HTTP/3, determining to communicate with the server using the protocol without an MTU limitation.

15. One or more non-transitory computer-readable media storing instructions that, when executed, cause one or more processors to perform operations comprising:
   detecting a change associated with a network interface of a client device;
   based at least in part on detecting the change, determining to identify a preferred communication protocol for a network over which the client device communicates using the network interface;
   transmitting, from the client device, a Hypertext Transfer Protocol (HTTP)/2 probe over the network and to a server;
   transmitting, from the client device, an HTTP/3 probe over the network and to the server;
   in response to receiving an HTTP/2 probe response and not a HTTP/3 probe response, determining that HTTP/2 is the preferred communication protocol; or
   in response to receiving the HTTP/2 probe response and the HTTP/3 response, determining that HTTP/3 is the preferred communication protocol; and
   communicating with the server using the preferred communication protocol over the network.

16. The one or more non-transitory computer-readable media of claim 15, the operations further comprising:
   caching results of the preferred communication protocol for the network interface; and
   based on network parameters of the network interface not changing, communicating with the server using the preferred communication protocol over the network on subsequent connections to the network.

17. The one or more non-transitory computer-readable media of claim 15, wherein the change associated with the network interface comprises at least one of:
   joining a new network by the client device;
   switching from a first network to a second network by the client device; or
   determining a network configuration change has occurred.

18. The one or more non-transitory computer-readable media of claim 17, the operations further comprising:
   joining a new network by the client device;
   caching information regarding whether HTTP/2 or HTTP/3 is a preferred communication protocol for the new network; and
   using the preferred communication protocol on subsequent connections to the new network.

19. The one or more non-transitory computer-readable media of claim 15, the operations further comprising:
   determining, at client device startup, if information regarding whether HTTP/2 or HTTP/3 is a preferred communication protocol is cached;
   in response to information regarding a preferred communication protocol being cached, communicating using the preferred communication protocol; or
   in response to information regarding a preferred communication protocol not being cached, transmitting the HTTP/2 and HTTP/3 probes over the network and to the server.

20. The one or more non-transitory computer-readable media of claim 15, the operations further comprising:
   transmitting, from the client device, multiple HTTP/2 probes over the network and to the server, wherein each of the multiple HTTP/2 probes are of a different packet size;
   transmitting, from the client device, multiple HTTP/3 probes over the network and to the server, wherein each of the multiple HTTP/3 probes are of a different size;
   based at least in part on HTTP/2 probe responses received and HTTP/3 probe responses received, determining if there are maximum transmission unit (MTU) limitations for either HTTP/2 or HTTP/3; and
   in response to determining that MTU limitations exist for one of HTTP/2 or HTTP/3, determining to communicate with the server using the protocol without an MTU limitation.

* * * * *